United States Patent [19]

Schulz

[11] Patent Number: 5,518,573
[45] Date of Patent: May 21, 1996

[54] DEVICE TO LIMIT THE GLUE WIDTH ON A GLUE APPLYING ROLL USED IN APPLYING GLUE TO A WEB FORMING A STRATIFIED WEB-LIKE WORKPIECE

[75] Inventor: Jens Schulz, Hamburg, Germany

[73] Assignee: Peters Maschinenfabrik GmbH, Hamburg, Germany

[21] Appl. No.: 157,979

[22] Filed: Nov. 24, 1993

[30] Foreign Application Priority Data

Nov. 25, 1992 [CH] Switzerland .......................... 03605/92

[51] Int. Cl.⁶ .................................................. B05C 11/04
[52] U.S. Cl. ........................... 156/356; 118/261; 118/669; 118/673; 118/679; 156/578
[58] Field of Search ....................................... 118/261, 673, 118/668, 669, 676, 677, 679; 156/356, 578

[56] References Cited

U.S. PATENT DOCUMENTS

| 3,065,730 | 11/1962 | Lyons ........................................ 118/673 |
| 3,898,955 | 8/1975 | Rosette et al. ........................ 118/261 X |
| 3,997,095 | 12/1976 | Lamb ........................................ 226/195 |
| 4,369,080 | 1/1983 | Johnson ................................ 156/356 X |
| 4,585,510 | 4/1986 | Hadjiskakis et al. ................... 156/555 |
| 4,661,380 | 4/1987 | Tillotson ............................... 118/261 X |
| 4,676,160 | 6/1987 | Linska .................................. 118/261 X |

FOREIGN PATENT DOCUMENTS

| 0179395 | 4/1986 | European Pat. Off. . |
| 0362423 | 4/1990 | European Pat. Off. . |
| 2029278 | 3/1980 | United Kingdom . |
| 2034608 | 6/1980 | United Kingdom . |
| 2068268 | 8/1981 | United Kingdom . |
| 2184959 | 7/1987 | United Kingdom . |

Primary Examiner—David A. Simmons
Assistant Examiner—Paul M. Rivard
Attorney, Agent, or Firm—Hill, Steadman & Simpson

[57] ABSTRACT

A device to limit the glue width on a glue applying roll of a gluing station for applying glue on a sheet of material characterized by the glue applying roll dipping into a container of glue, a doctor blade engaging a surface of the glue applying roll to remove glue, said doctor blade being mounted by an arrangement which moves the blade laterally along the axis of the roll in response to the detected position of the web so that as the web shifts laterally, the edges of the glue film are simultaneously shifted. Preferably, the apparatus includes a second blade which is larger than each doctor blade which has an edge positioned spaced from the surface of the glue applying roll to reduce the size of the film in the area of the doctor blade.

11 Claims, 2 Drawing Sheets

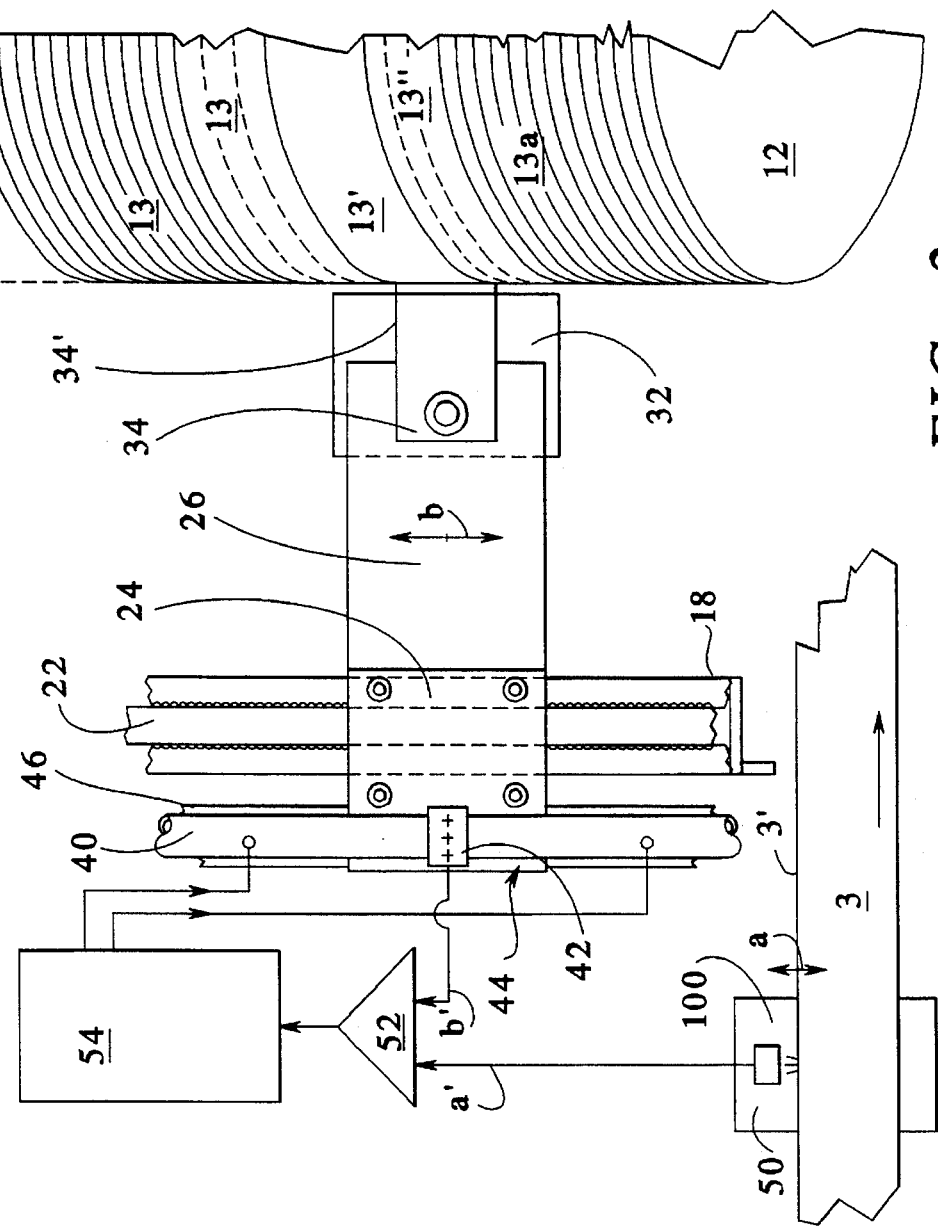

DEVICE TO LIMIT THE GLUE WIDTH ON A GLUE APPLYING ROLL USED IN APPLYING GLUE TO A WEB FORMING A STRATIFIED WEB-LIKE WORKPIECE

BACKGROUND OF THE INVENTION

The present invention is directed to a device for limiting the width of a glue film being applied on a roller which is arranged within a machine which continually produces a stratified web-like workpiece. More specifically, the invention is directed to a device to control the width of the glue film on a glue applying roller which itself is located in a double-face gluing station arranged within a machine the produces corrugated board.

In producing a "double-face" corrugated board, which is two outer sheets joined together by a corrugated inner layer, a first cover sheet paper web travels almost directly through such a double-face gluing station as well as at least a second so-called "single-face" web, which is a corrugated paper glued onto a body paper. In this station, a glue applying or sizing roll will apply a predetermined amount of glue on every crest of the single-face web in such a way that the crest may be assembled with the cover paper web at a level of the so-called double-face station which will include a succession of heating tables as well as a pressure assembly means.

One of the problems caused by the high travelling speed of the cover paper web through the various stations is a lateral shifting of the web which cannot be reduced to a rate lower than more or less than 30 millimeters despite all of the guiding devices. Thus, a systematic gluing over the whole width of the corrugations of the single-face web leads very quickly to a clogging of the heating tables of the double-face station due to the glue application on the uncovered portions of the corrugated parts. This phenomenon is hazardous and will produce two large welts of hardened glue build-up on the table, which residue might strongly damage the edges of the corrugated boards which are later produced.

In order to solve the problem, the glue container in which the gluing roll of the double-face station dip is constructed with variable geometry, i.e., the lateral walls are automatically shifted crosswise according to the instantaneous position of the cover paper web as scanned by an appropriate detecting device. Hence, the position and the width of the glue film gathered by the gluing roll are directly linked with the location of the cover paper web, which means that during the assembling process accomplished in the double-face station, the corrugations not covered by this cover paper web will have no previous application of glue.

Even though this device automatically limits the width of the glue film satisfactorily, it suffers from numerous inconveniences. First of all, it is almost impossible to quickly shift the lateral walls without involving an involuntary change in the level of the resident glue within the container, which change in level might mean an excess or lack of glue on the glue applying roll and then on the crest. In other words, dirt will still build up on the heating tables in the course of too quick of transition or the production of sheet-like corrugated board. Furthermore, the technique of shiftable lateral walls is awkward, especially when it concerns the creation of tight seals between the container and the perimeters of the walls and surface of the glue applying roll. Due to these facts, the devices are rather expensive to manufacture.

SUMMARY OF THE INVENTION

An object of the present invention consists in providing a device to limit the gluing area on a corrugated board, which is more efficient and can be adjusted more quickly through insuring the entire absence of glue on unwanted crest parts of the corrugated board. The conception of such a device should preferably be as simple as possible to permit its manufacture at a low cost.

To accomplish these goals, the present invention is directed to a device for limiting the glue width on a rotating glue applying roll, which device has first means for detecting the instantaneous position of the edges of a first web-like workpiece travelling around a first guiding roll of the machine, second means for controlling the position and the width of the glue film gathered on the glue applying roll which dips in a glue container and applies this glue on a second web-like workpiece travelling around a second guiding roll of the machine. The second means includes a pair of doctor blades which are held to extend perpendicular against the cylindrical surface of the glue applying roll with the help of positioning means which will control the position of the doctor blades along the edge of the glue applying roll in response to the scanning results of the first means in such a way that the inner edge of a glue strip scraped by the doctor blade from the glue applying roll matches the position of the corresponding edge of the first web-like workpiece.

Thus, the device of the present invention will limit the glue width on a glue applying roll which is arranged within a machine which continuously produces a stratified web-like workpiece. In other words, the glue applying roll will dip over its entire length in the glue container and then two strips of glue are subsequently scraped off of this roll and these strips have their inner edges in perfect correspondence with the cover paper web which is to be subsequently applied. On the other hand, the two strips of glue at the ends of the glue applying roll, which meet no single-face web at the level of the guiding roll, will still occur. It may easily be understood that the major advantage of the device remains in the fact that these doctor blades need only be shifted crosswise very accurately, which action requires just a little effort in order to obtain a desired gluing which may instantaneously involve depending on the previous deviations of the cover paper web.

Usefully, every doctor blade is doubled with a larger lower blade which extends parallel to and separate from the surface of the gluing roll by a predetermined distance so as to reduce the thickness of the glue film reaching the doctor blade. This will, thus, increase the power of the doctor blade to locally suppress the glue film.

Advantageously, the means for holding and positioning the doctor blade and, if wanted, the second blade comprises a carrying arm which extends almost perpendicular to the glue applying roll and is fitted on a carriage which can slide along a rail mounted on a crossbar, itself extending parallel to the axis of the glue applying roll. The doctor blade and, if present, the second blade are fitted on the end oriented toward the glue applying roll, whereas the other end carries a position detecting means located opposite a scanning rule which is mounted along the crossbar and means for shifting the carriage along the crossbar by a linear actuator.

Owing to this arrangement, the doctor blade and its complimentary blade are held in a very rigid way orthogonally to the glue applying roll but can very easily be shifted laterally. Every lateral shift can be directly detected without error owing to a photodiode arranged opposite a rule for the comparison to and the correction through electronic means with reference to the instantaneous position of the corresponding edge of the cover paper web.

Advantageously, the linear actuator is a hydraulic cylinder separated into two compartments by a floating piston. The piston is linked to a ring which surrounds the cylinder by a magnetic coupling and this ring is fixed on the carriage so that the carriage moves with the piston as the piston is shifted within the cylinder.

Compared to other means for linear shifting, such as the rotation of an endless screw in a threaded bore of the carriage, the described device is quicker and more accurate.

Preferably, the doctor blade is made out of a bronze sheet or a rigid plastic sheet, whereas the second blade is preferably made of a copper sheet or brass sheet.

Other advantages and features of the invention will be readily apparent from the following description of the preferred embodiments, the drawings and claims.

BRIEF DESCRIPTION OF THE DRAWINGS

FIG. 1a is an enlarged view showing the relationship of the floating piston, ring and cylinder; and FIG. 2 is a schematic top plan view including a diagram of the control device.

DESCRIPTION OF THE PREFERRED EMBODIMENTS

Figure 1:
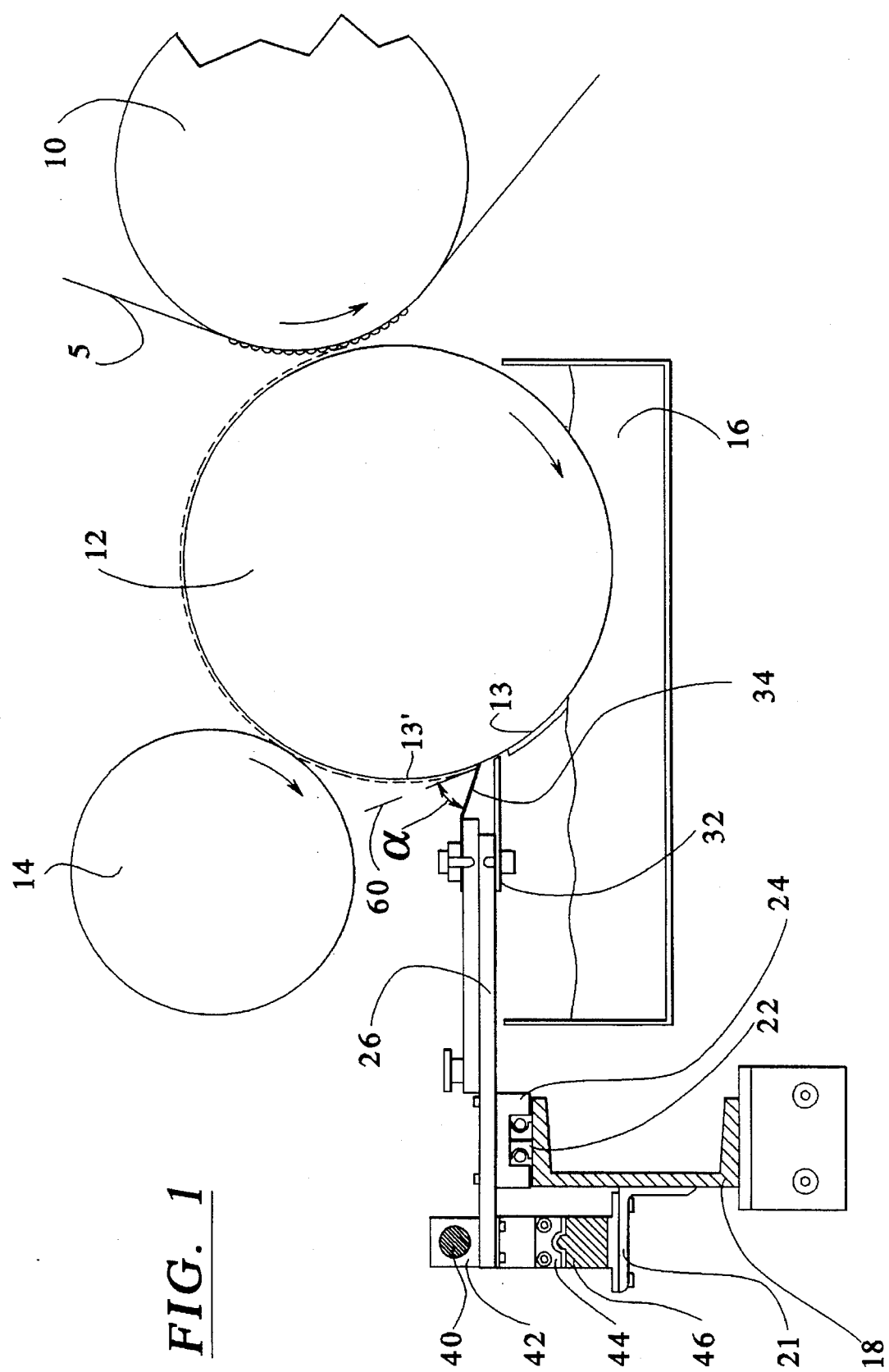
FIG. 1 is a schematic side view with portions broken away for purposes of illustration of the device of the present invention.

As best illustrated in FIG. 1, a double-face gluing station or machine includes a guiding cylinder 10 around which a single-face corrugated paper web 5 travels. The web 5 is positioned on the cylinder 10 so that the corrugations are oriented to extend outward away from the surface of the cylinder so as to face a glue applying roll 12. The glue applying roll 12 dips into a glue container 16 in such a way that when it rotates in a clockwise direction, as illustrated, it will take up a film 13 of glue on its cylindrical surface. The thickness of this glue film is calibrated or adjusted further by a laminating or doctor roll 14 which rejects the excess when rotated in the same direction (clockwise) as the roll 12. The glue film with the desired calibrated thickness leads to a just-sufficient glue application on the crests of the corrugated paper 5. As illustrated, the surface of the glue applying roll 12 and the surface of the guiding cylinder 10 are spaced apart so that they will not contact each other in those areas not including the paper web 5.

As illustrated in FIGS. 1 and 2, the device to limit the glue width is essentially fitted on a crossbar 18 of a frame, which crossbar extends parallel to the axis of the glue applying roll 12. The upper surface of the crossbar 18 is provided with a pair of smooth bearings 22 or, more advantageously, a pair of ball rails which are arranged to extend parallel at a level of every end of the glue applying roll 12. A carriage 24, which may slide with a minimum friction, is fitted on the ball rail 22. This carriage 24 supports a carrying arm 26 which extends perpendicular to the ball rails 22 and, hence, to the axis of the glue applying roll 12.

A first doctor blade 34 is fitted in an adjustable manner on the end of the carrying arm 26, which is oriented toward the glue applying roll 12. The doctor blade 34 is attached, for instance, by means of a screw on an upper surface of the end of the arm in order to have its final position properly adjusted so that its front edge is applied firmly against the cylindrical surface of the roll 12. This doctor blade 34 is made, for instance, out of a sheet of bronze or a rigid plastic sheet and has a width of 40 millimeters. The doctor blade 34 is slightly bent in order to make an angle α with a tangent 60 at the point of contact of the edge with the cylindrical surface of the roll 12. This angle α preferably is in a range between 40° and 50°.

After numerous tests, it has been proven that it is desired to also arrange a second blade 32 on the carrying arm 26. The blade 32 is larger than the doctor blade 34 but fitted so as to maintain a space of say 0.1 millimeter to 1 millimeter from the cylindrical surface of the glue applying roll 12. This blade 32 may have a width of 60 millimeters and is made, for instance, out of a sheet of copper or a sheet of brass. The blade 32 will also form an angle with a tangent located at the point of intersection with the surface of the glue applying roll, and this angle is in a range of 60° to 80°. The opposite end of the arm 26 carries a detector 44 which is mounted opposite a rule 46, which is mounted to extend parallel along the crossbar 18 by means of a member 21, which is illustrated as an angle iron. On an upper surface of the opposite end, a ring 42 or member with a bore is mounted. This ring loosely surrounds a hydraulic cylinder 40, as best illustrated in FIG. 1a, and the hydraulic cylinder contains a floating piston 40a. The ring 42 is coupled to the piston 40a by a magnetic coupling through the wall of the cylinder 40 so that the ring and carrying arm 26 will be shifted with the piston 40a.

As illustrated in FIG. 2, a cover paper web 3 will travel at high speeds and be subjected to lateral deviations in a direction of arrow a. This lateral deviation is scanned by a mechanical apparatus with rollers or, preferably, by an opto-electronic apparatus 50 as the web 3 passes around a guiding roll 100. The scanning will result in producing an electrical signal a' which is applied to a first input of a comparator 52.

In the meantime, the last position of the supporting arm 26 will appear in the form of a signal b' which is issued by the scanning apparatus or means 44, 46 and is applied to the second input of the comparator 52 which will compare the position of the arm 26 relative to the edge 3' of the web 3. The comparator produces a signal which is applied to a pneumatic/hydraulic device 54, and this device, which is a conventional construction, will allow a control and shift of the inner piston 40a in the cylinder 40 by means of pneumatic valves which control the input or output of oil or fluid in the cylinder 40. The shift of the piston 40a is magnetically transmitted to the ring 42 and causes a shifting of the arm 26 to a new position so that the lateral edge 34' of the doctor blade 34 oriented toward the center of the glue applying roll 12 will correspond to the position of the edge 3' of the covering web 3.

As illustrated in FIG. 2, the second blade 32 reduces greatly the thickness of the initial film 13 of the glue over a strip 13'. The doctor blade 34 can then remove the glue entirely over a strip 13' from the surface of the glue applying roll 12 and, as illustrated in FIG. 2, the strip 13" of the blade 32 is wider than the strip 13' of the doctor blade 34. Thus, the crest of the corrugated paper 5, which will not be covered due to the deviation of the cover paper web 3, will not be coated with glue and, thus, this will eliminate any risk of dirt or glue being applied to parts in the successive or following double-face station.

It should be noted that the glue applying roll 12 will have a strip 13a on each end which is fully covered with glue, but it will not be able to be deposited onto the guiding roll 10 because of the space always greater than 1 millimeter that remains between the surface of the glue applying roll 12 and the surface of the guiding roll 10. The glue strip 13a on the end of the glue applying roll 12 will, thus, not interfere with any of the other processes.

During a workshop test, the shifting of the supporting arm 26 in the direction of the arrow b could be obtained at a speed of 20 millimeters per second, and this speed represents almost four times the speed for the adjustment of the device of the prior art mentioned hereinabove. Moreover, owing to the sensitivity obtained by the hydraulic/pneumatic amplification and to the tight link between the magnetic piston 40a of the cylinder 40 and the carrying arm 26, which is able to slide almost without friction, a remarkable position accuracy is reached.

Finally, the device is relatively simple in its conception and can be manufactured at a very reasonable cost, which fact is not to be neglected.

Although various minor modifications may be suggested by those versed in the art, it should be understood that I wish to embody within the scope of the patent granted hereon all such modifications as reasonably and properly come within the scope of my contribution to the art.

I claim:

1. A device to limit the width of glue being applied by a machine which continuously processes stratified web-like workpieces, said machine including a glue applying roll, a first guiding roll for a first web-like workpiece to be joined to a second web-like workpiece, a second guiding roll for guiding the second web-like workpiece as the glue applying roll applies a film of glue on the second web-like workpiece and a container of glue in which a portion of a periphery of the glue applying roll is immersed to pick up a film of glue for transfer to the second web-like workpiece, said device including first means for instantaneously detecting the position of edges of the first web-like workpiece travelling around the first guiding roll and creating a signal based on the position of each of the edges, second means for controlling the position of the edge of the film of glue on the glue applying roll in response to the output of the first means, said second means including a pair of doctor blades, positioning means for separately holding each of the doctor blades perpendicularly against a peripheral surface of the glue applying roll to remove a first strip of glue therefrom, a second blade with a larger width than the doctor blade extending parallel to each doctor blade and extending a predetermined distance from the peripheral surface of the glue applying roll so as to reduce the thickness of a second strip of a glue film wider than the first strip before it reaches the doctor blade, said positioning means being shifted along the axis of the glue applying roll in response to a signal created from the first means so that the inner edge of a glue strip being scraped by the doctor blade matches the position of the corresponding edge of the first web-like piece.

2. A device according to claim 1, wherein the positioning means for holding extends substantially perpendicular to the axis of the glue applying roll and is mounted on a carriage which can slide along a rail secured on a crossbar extending parallel to the axis of the glue applying roll, said doctor blade and second blade being mounted on an end of the arm positioned adjacent the glue applying roll, the other end of the arm carries means for detecting the position on a scanning rule which is fixed on the crossbar and said other end being shiftable on the crossbar by a linear actuator.

3. A device according to claim 2, wherein the linear actuator is a hydraulic cylinder separated into two chambers by a floating piston, said carrying arm having a ring surrounding the cylinder and being coupled to the piston to move therewith by a magnetic coupling.

4. A device according to claim 3, wherein the doctor blade is made out of bronze sheet.

5. A device according to claim 3, wherein the doctor blade is made out of a rigid plastic sheet.

6. A device according to claim 3, wherein the second blade is made of a copper sheet.

7. A device according to claim 3, wherein the second blade is a brass sheet.

8. A device according to claim 1, wherein the second blade is made of a sheet selected from a copper sheet and a brass sheet.

9. A device according to claim 1, wherein the doctor blade is made out of a material selected from a bronze sheet and a rigid plastic sheet.

10. A device according to claim 1, wherein the doctor blade is a rigid plastic sheet.

11. A device according to claim 1, wherein the machine is a double-face gluing station for producing corrugated board, said second web-like workpiece including a corrugated layer and said glue applying roll transferring the glue film to the crest of the corrugated layer.

* * * * *